UNITED STATES PATENT OFFICE.

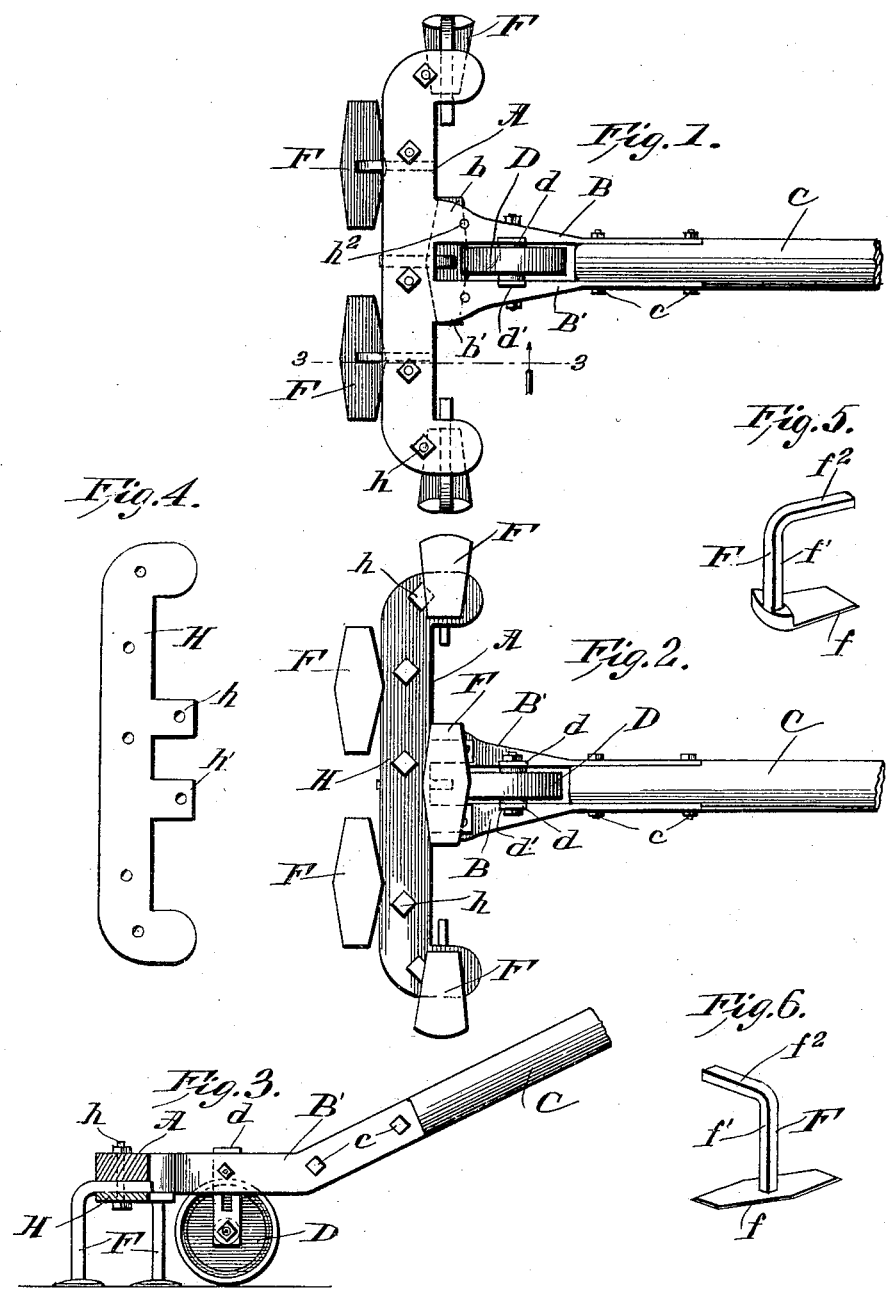

JOHN BAPTIST PELLEGRIN AND LOUIS ROI PELLEGRIN, OF CHAUVIN, LOUISIANA.

CULTIVATOR.

No. 806,707.  Specification of Letters Patent.  Patented Dec. 5, 1905.

Application filed May 31, 1905. Serial No. 263,194.

*To all whom it may concern:*

Be it known that we, JOHN BAPTIST PELLEGRIN and LOUIS ROI PELLEGRIN, citizens of the United States, and residents of Chauvin, in the parish of Terrebonne and State of Louisiana, have made certain new and useful Improvements in Cultivators, of which the following is a specification.

Our invention is an improvement in cultivators of the hand-propelled type; and it consists in certain novel constructions and combinations of parts hereinafter described and claimed.

Referring to the drawings, forming a part hereof, Figure 1 is a top plan view of our invention. Fig. 2 is a bottom plan view thereof. Fig. 3 is a section on the line 3 3 of Fig. 1. Fig. 4 is a plan view of the hoe-securing plate. Fig. 5 is a detail of one of the end hoes, and Fig. 6 is a detail of one of the central hoes.

In the practical application of our invention we provide a head A, having the general outline shown in Fig. 1 and provided with a plurality of transverse grooves in its lower face. Arms B B', projecting rearwardly from the head and spaced apart, are adapted to receive between them a handle C, of wood or other suitable material, and are secured thereto by bolts $c$, engaged by nuts $c'$. The arms B B' are provided with transverse grooves $b\ b'$ adjacent to the head for a purpose to be hereinafter described.

A supporting-wheel D, journaled in slotted plates $d$, sliding in grooves $d'$ in the inner faces of the arms and adjustably secured to the arms by bolts and nuts $d^2$, is provided for supporting the head.

A plurality of hoes F, each comprising a cutting-blade $f$, supported by an arm or shank $f'$, having a lateral extension $f^2$ for engaging the grooves in the lower surface of the head, are adjustably secured in place on the head by means of a plate H, having the general shape of the head and secured thereto by bolts and nuts $h$, traversing the head and plate. The plate H is provided with extensions $h'$, extending over upon the lower surface of the arms B B' and secured thereto by the bolts $h^2$.

The hoes F, secured to the ends of the head, are of the shape shown in Fig. 5 and are provided with only an inwardly-extending blade, while the centrally-arranged hoes are provided with blades on either side.

Our invention is adapted for use in any form of gardening or wherever a cultivator is desirable, but is more especially adapted to the cultivation of onions. In operation the hoes pass along beneath the surface of the ground, cutting the weeds and grass, but not disturbing the surface of the earth to any great extent. This feature is of a special advantage in the cultivation of garlic and onions, since when small they are delicate plants and easily damaged.

The provision of the slotted sliding plates for supporting the head provides a simple means of adjusting the depth of the hoes, and the arrangement of the supporting-wheel between the hoes and the handle allows the hoes to lift from the earth at the end of the row or wherever else desired merely by depressing the handle, and when not in use the hoes may be lifted clear of the ground in the same manner for transportation. The hoes are adjustable inwardly and outwardly with respect to the head by loosening the plate H. By removing the hoes and securing the digger I in the grooves on the under face of the arms an efficient means for digging onions is provided. The operation of digging is similar to that of cultivating.

It will be evident from the description that we provide a cultivator simple in construction, easily adjusted, and easily operated. The placing of the supporting-wheel behind the hoes lessens the draft and permits a more even passage of the hoes.

Having thus described our invention, what we claim as new, and desire to secure by Letters Patent, is—

1. In a cultivator, the combination of a head provided with transverse grooves in its lower face, arms spaced apart, projecting rearwardly from the head, and provided with transverse grooves in their lower faces, a handle secured between the free ends of the arms, slotted plates slidably mounted in grooves in the inner faces of the arms, bolts traversing the slots in the plates, and the arms, nuts engaging the bolts, a wheel journaled in the lower ends of the plates, a plurality of hoes mounted in the grooves in the head, and comprising each a cutting-blade, a bracket rigid with the blade and having an angular extension for engaging the grooves of the head, a plate on the head and engaging the angular extensions, bolts traversing the head and plate, and nuts engaging the bolts.

2. In a cultivator, the combination of a head provided with transverse grooves in its lower face, rearwardly-projecting arms rigid with the head and spaced apart, a handle secured between the free ends of the arms, plates slidably mounted in grooves in the inner faces of the arms, means whereby the plates may be adjusted with respect to the arms, a wheel journaled in the lower ends of the plates, a plurality of hoes mounted in the grooves in the head, and comprising each a cutting-blade, a bracket rigid with the blade and having an angular extension for engaging the grooves of the head, and means engaging the angular extensions for securing them to the head.

3. In a cultivator, the combination of a head provided with transverse grooves in its lower face, arms spaced apart projecting rearwardly from the head, a handle secured between the free ends of the arms, slotted plates slidably mounted in grooves in the inner faces of the arms, bolts traversing the slots in the plates and the arms, nuts engaging the bolts, a wheel journaled in the lower ends of the plates, and a plurality of hoes mounted in the grooves in the head.

4. In a cultivator, the combination of a head having transverse grooves in its lower face, a plurality of hoes mounted in the grooves in the head, a plate for engaging the hoes for holding them in the head, a wheel for supporting the head, and a handle projecting rearwardly therefrom.

JOHN BAPTIST PELLEGRIN.
LOUIS ROI PELLEGRIN.

Witnesses:
  SERGIUS BRIEN,
  JOHN McELROY.